UNITED STATES PATENT OFFICE.

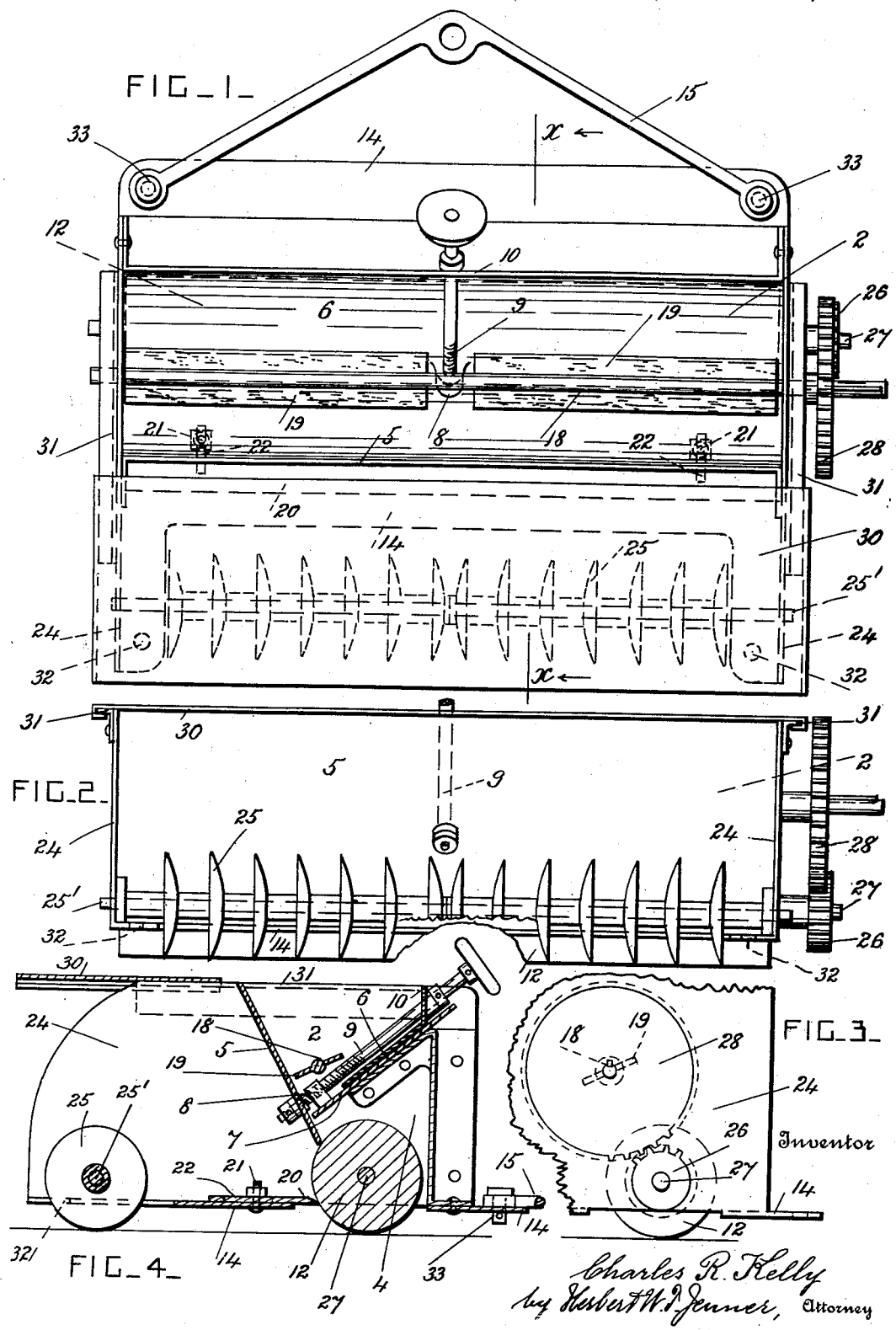

CHARLES R. KELLY, OF CAMBRIDGE SPRINGS, PENNSYLVANIA.

FERTILIZER-DISTRIBUTER.

1,171,960.

Specification of Letters Patent.

Patented Feb. 15, 1916.

Application filed April 19, 1915. Serial No. 22,409.

*To all whom it may concern:*

Be it known that I, CHARLES R. KELLY, a citizen of the United States, residing at Cambridge Springs, in the county of Crawford and State of Pennsylvania, have invented certain new and useful Improvements in Fertilizer-Distributers; and I do hereby declare the following to be a full, clear, and exact description of the invention, such as will enable others skilled in the art to which it appertains to make and use the same.

This invention relates to machines for distributing lime and other fertilizing material in the form of fine powder and rolling it onto and mixing it with the soil; and it consists in the novel construction and combination of the parts hereinafter fully described and claimed.

In the drawings, Figure 1 is a plan view of a machine constructed according to this invention, and showing the hopper cover slid open. Fig. 2 is a rear end view of the machine. Fig. 3 is a side view of the gearing. Fig. 4 is a cross-section through the machine, taken on the line $x$—$x$ in Fig. 2.

The machine has a box-shaped frame the upper part 2 of which forms a hopper in which the lime or other powdered fertilizing material is placed. This frame has a roller chamber 4 below the hopper. An inclined back plate 5 is provided which is common to the hopper and the roller chamber. A partition plate 6 having a slidable section or hopper door 7 is arranged between the hopper and the roller chamber, and is inclined downwardly and rearwardly. A nut 8 is secured to the slidable section 7, and a screw 9 is journaled in the back plate 5 and in a vertical extension 10 on the plate 6, and this screw engages with the nut 8. The slidable door or section 7 is slid back and forth to vary the outlet opening from the hopper to the roller chamber. A land roller 12 is journaled in the roller chamber, and rests on the ground so that it holds the bottom plate of the roller chamber a little above the level of the ground. A draft attachment 15 is connected by pins 33 to the projecting front end portion of the bottom plate 14 for convenience in drawing the machine forwardly over the ground. An agitator 18 is journaled in the hopper close above its outlet, and is provided with a projecting wing or wings 19 for stirring up the lime. An adjustable scraper 20 is carried by the bottom plate 14, and is provided with screws 21 for holding it in place. The screws pass through slots 22 in the scraper, and permit the scraper to be adjusted. The scraper removes lumps of dirt which adhere to the roller, and the lime which falls into the roller chamber from the hopper is carried over the top of the roller and is allowed to drop onto the ground in front of it. As the distance between the bottom plate 14 and the ground is very short, and as the bottom plate operates as a wind screen, the finely powdered material is not blown away by the wind, but is pressed against the earth by the roller, and any earth and lime which adhere to the roller are removed therefrom by the scraper so that they drop back onto the ground.

The sides 24 of the machine frame are extended rearwardly beyond the hopper and the roller chamber, and a mixing device 25 is journaled between them, and is arranged to bear on the surface of the ground. This mixing device consists of a series of disks similar to those used on disk cultivators, said disks being mounted on a supporting shaft 25'. The roller is revolved continuously by contact with the earth as the machine is drawn along, and the agitator 18 is revolved from the roller at a considerably lower speed by means of a toothed pinion 26 secured on the projecting end portion of the shaft 27 of the roller. This pinion gears into a toothed wheel 28 secured on the projecting end portion of the shaft of the agitator, and is splined thereon so that it can be disconnected from the pinion at will. The top of the hopper is provided with a cover 30 which slides upon guides 31 secured to the side plates 24 of the machine frame, but any other form of cover may be used, if desired.

The machine makes a very satisfactory seed bed, as the ground is rolled by the land roller and the lime is applied to the ground and incorporated with its surface all in one operation, and without loss by some of the lime being blown away or being unevenly distributed by the wind.

The draft attachment 15 can be removed and connected to holes 32 at the rear part of the frame, by means of its pins 33, so that the machine can be drawn rearwardly if desired to use it as a cultivator and land roller only, before using it as a fertilizer distributer.

What I claim is:

1. A fertilizer distributer, comprising a frame provided with a roller chamber and a hopper above the roller chamber, a land roller journaled in the roller chamber and supporting the frame, a scraper connected to the bottom of the frame behind the roller and projecting toward it, an agitator journaled in the hopper, and driving mechanism operating to revolve the agitator from the roller as the machine is drawn along.

2. A fertilizer distributer, comprising a frame provided with a roller chamber and a hopper above the roller chamber, a land roller journaled in the roller chamber and supporting the frame, a roller scraper connected to the bottom of the frame behind the roller, a mixing device journaled in the frame and arranged behind the roller and its scraper and revolved by contact with the ground, an agitator journaled in the hopper, and driving mechanism operating to revolve the agitator from the roller as the machine is drawn along.

In testimony whereof I have affixed my signature.

CHAS. R. KELLY.